Nov. 6, 1956
C. GOODMAN
2,769,914
APPARATUS FOR LOGGING THE FLUORESCENCE AND
PHOSPHORESCENCE OF EARTH FORMATIONS
TRAVERSED BY A BOREHOLE
Filed Nov. 8, 1951
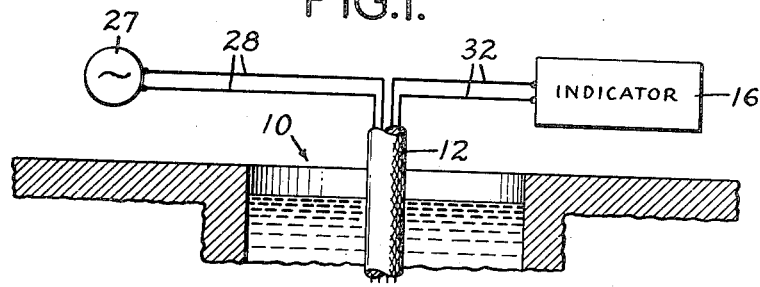
FIG.1.
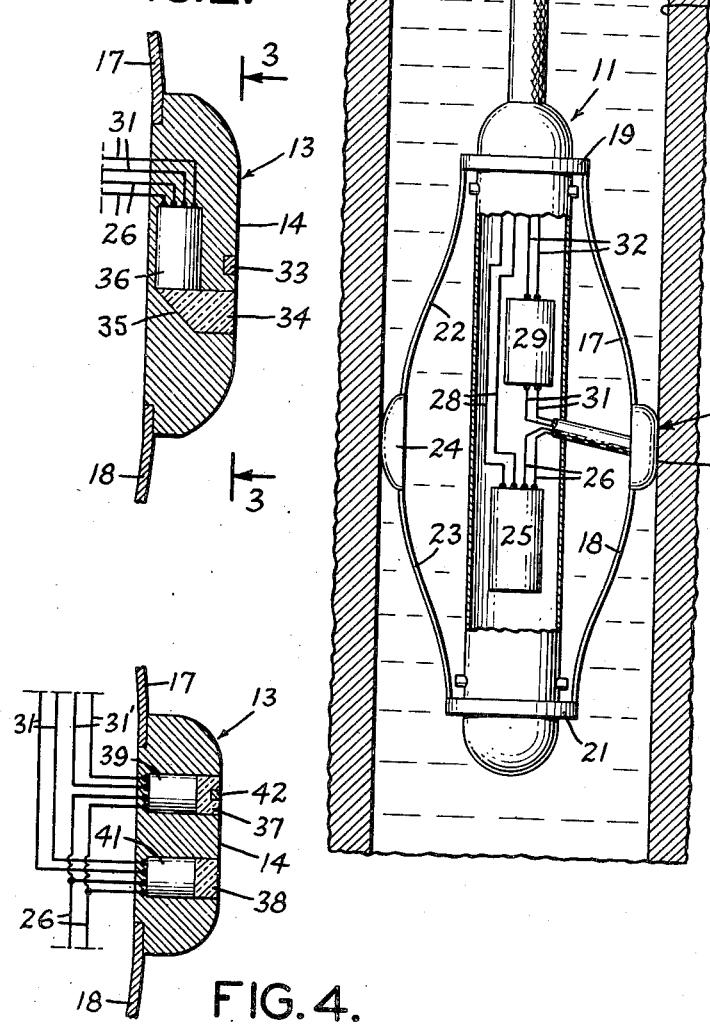
FIG.2.
FIG.4.
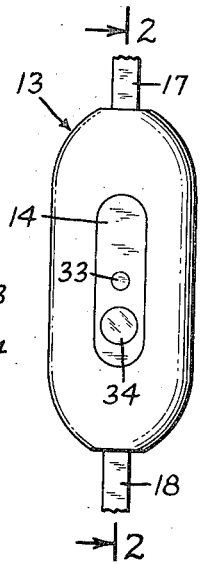
FIG.3.
INVENTOR.
CLARK GOODMAN
BY
Campbell, Brumbaugh, Free & Graves
HIS ATTORNEYS.

United States Patent Office 2,769,914
Patented Nov. 6, 1956

2,769,914

APPARATUS FOR LOGGING THE FLUORESCENCE AND PHOSPHORESCENCE OF EARTH FORMATIONS TRAVERSED BY A BOREHOLE

Clark Goodman, Boston, Mass., assignor to Schlumberger Well Surveying Corporation, Houston, Tex., a corporation of Delaware Application November 8, 1951, Serial No. 255,482

5 Claims. (Cl. 250—71)

The present invention relates to the logging of boreholes drilled into the earth and, more particularly, to methods and apparatus for obtaining indications of the fluorescent and/or phosphorescent properties of material in or surrounding a borehole.

It has been proposed by A. Claudet in Patent No. 2,334,475, issued November 16, 1943, to obtain indications of the types of formations traversed by a borehole by passing a source of ultraviolet light along the wall of the borehole and obtaining indications of the fluorescence or phosphorescence of the material comprising the wall. However, the intensity of the ultraviolet light source may not be sufficient to excite appreciable fluorescence or phosphorescence in certain materials. Furthermore, the fluorescent or phosphorescent properties of certain other materials may not be excited by ultraviolet light in the least degree, or the materials may be so located that it is very difficult to irradiate them with ultraviolet light.

Accordingly, it is an object of the invention to provide novel methods and apparatus for obtaining a log of the fluorescent and/or phosphorescent properties of material in or surrounding a borehole.

In accordance with the invention, a source of radioactive radiation is disposed in a borehole for the purpose of irradiating a zone adjacent the wall thereof, and indications are obtained of the radiant energy, usually visible light, emitted from the zone in response to radioactive energization. The zone may comprise drilling mud, mud cake, and/or a portion of the formation surrounding the borehole.

In order that the invention may be more clearly understood, it will now be described in detail with reference to the accompanying drawings, in which:

Figure 1 is a longitudinal sectional view of a borehole within which is disposed apparatus embodying the present invention;

Figure 2 is a plan view of a shoe forming a portion of the apparatus in Figure 1 and containing a source of radioactivity and a photosensitive device for carrying out the method of the present invention;

Figure 3 is a vertical section of the shoe shown in Figure 2 taken along the line 3—3 in the direction indicated by the arrows; and Figure 4 is a vertical section of a modification of the shoe adapted to detect phosphorescence as well as fluorescence.

Referring now to Figure 1, there is illustrated apparatus for obtaining indications of the fluorescent and/or phosphorescent properties of materials in or surrounding a borehole 10. A pressure-resistant housing 11 is suspended by a multiconductor cable 12 and adapted to be raised or lowered in the borehole 10. A shoe 13, carried by the housing 11, contains a source of radioactive radiation, for example, a radioactive isotope, mounted substantially flush with a face 14 directed toward the wall 15 of the borehole 10. The shoe 13 encloses one or more photosensitive devices which are exposed through one or more translucent windows in the surface 14. As the housing 11 is moved through the borehole, a zone adjacent the wall 15 is bombarded by radioactive radiation and any fluorescence and/or phosphorescence that is induced by this radiation is detected by the photosensitive device or devices. Electrical signals representative of the detected light are transmitted through the cable 12 to the surface of the earth where they may be measured by indicating means 16.

If it is desired to obtain a log of the material comprising the wall 15 of the borehole 10, the shoe 13, as shown in Figure 1, is supported by leaf springs 17 and 18 from sliding collars 19 and 21 on the housing 11. In order to maintain the housing 11 centered in the borehole, supplementary leaf springs 22 and 23 are fixed on the collars 19 and 21, respectively, diametrically opposite springs 17 and 18, respectively. A back-up pad 24 is connected to the adjacent ends of springs 22 and 23 and is forced outwardly in a direction opposing the force exerted on the shoe 13. Accordingly, the shoe 13 is maintained in contact with the wall 15 of the borehole 10 as the housing 11 is raised or lowered.

The shoe 13 may be formed with a broad contacting surface 14 which permits the shoe to ride over any mud cake that may be encountered on the wall 15 of the borehole. Such an arrangement is valuable in locating permeable formations on which a mud cake has been formed if the drilling mud has fluorescent properties. Fluorescent oil-base muds may be used or fluorescent material may be purposely added to the drilling mud.

Alternatively, the surface 14 of the shoe 13 may be sufficiently narrow and sharp-edged as to cut through any mud cake and at all times make actual contact with the formations traversed by the borehole 10.

The source may be an intense beta ray emitter, such as, for example, strontium–89, or phosphorus–32. Such beta ray emitters provide a highly localized area of fluorescence due to the fact that beta rays are readily absorbed by materials in the vicinity of the source.

The photosensitive device or devices are preferably photoelectric electron multiplier tubes, such as, for example, an R. C. A. type 5819 or an R. C. A. type 931.

The operating potentials required by the photo-sensitive device or devices are provided by a high voltage power supply 25 through a pair of conductors 26. The power supply 25 may be at the surface of the earth or, as shown, may be conveniently mounted in the pressure-resistant housing 11. The power supply 25 is energized from the surface of the earth by an alternating current source 27 connected by a pair of conductors 28, which extend through the cable 12 to the housing 11.

The electrical signals developed by the photo-sensitive device or devices in response to the fluorescent or phosphorescent light observed through the window or windows in the surface 14 of the shoe 13 are preferably applied by conductors 31 to amplifying means 29, which is likewise enclosed in a housing 11. The output of the amplifying means 29 is transmitted through conductors 32 in the cable 12 to the indicating means 16 on the surface of the earth. The indicating means 16 is preferably arranged to make a record of the intensity of the detected fluorescence and/or phosphorescence with reference to the depth of the shoe 13 in the borehole 10.

One specific form of the shoe 13 is shown in Figures 2 and 3 wherein a radioactive material 33 is placed in the middle of the face 14 and window 34 is located below the radioactive material 33 and is provided with an internally reflecting surface 35 which directs light upon the end of a photoelectric tube 36. The radio-active material 33 is placed as close to the window 34 as possible in order to permit measurement of the fluorescent properties of the zone in the borehole that is to be investigated.

If it is desired to measure the phosphorescent properties of the zone, such as, for example, the superficial surface of the wall of the borehole, the radioactive material 33 is spaced a substantial distance from the window 34. Under these conditions the intensity of phosphorescence is measured by the photoelectric tube 36 as the shoe 13 is raised through the borehole. It is evident that a radioactive source could be placed below the window 34 to permit logging of the borehole as the shoe 13 is lowered. Furthermore, two radioactive sources may be placed symmetrically above and below a single window or two windows may be employed above and below a single radioactive source to permit a logging in either direction.

Figure 4 illustrates a shoe 14 constructed to provide simultaneous indications of the fluorescent and phosphorescent properties of the material on the wall 15 of the borehole 10. Vertically spaced windows 37 and 38 are provided in the surface 14 associated with photoelectric tubes 39 and 41, respectively. A radioactive source 42 is embedded in the window 37 flush with the face thereof. As the shoe 13 is raised through the borehole, photoelectric tube 39 responds to the fluorescence of the material in the vicinity of the window 37 while the photoelectric tube 41 generates electrical signals representative of the intensity of the phosphorescent quality of the material investigated. The signals provided by the tubes 39 and 41 are transmitted over separate pairs of leads 31 and 31' to individual amplifying circuits in the amplifying means 29 and subsequently separately recorded in the indicating means 16.

Although the shoes shown in Figures 2, 3 and 4 are adapted to slip over the surface of the wall of the borehole, it is to be understood that the same arrangements of radioactive sources and photoelectric tubes may be incorporated in a shoe having a narrow contacting surface 14 which plows beneath any mud cake adhering to the wall of the borehole and rubs directly against the material comprising the surrounding formations. Many variations in the basic arrangement will be apparent to one skilled in the art. For example, several radioactive sources, which may have different radiation characteristics, can be spaced longitudinally of the shoe 13 and each provided with an individual window and photoelectric tube. The logs obtained from the output of each photoelectric tube would represent different fluorescent and/or phosphorescent properties of the material. Furthermore, simultaneous logs may be obtained by employing one or more sources and corresponding photosensitive devices exposed to the drilling mud, to the mud cake and/or to the actual wall of the borehole. In addition, other logging methods may be used simultaneously with the methods of the present invention, such as, for example, the fluorescent logging methods disclosed in the above-mentioned Patent No. 2,334,475 to A. Claudet or electrical logging methods.

In view of the many possible modifications of the basic inventive concept, it is to be understood that the illustrated embodiments are exemplary only and the invention is limited only by the scope of the appended claims.

I claim:

1. In apparatus for logging a borehole in the earth, the combination of an elongated body adapted to be moved through the borehole, a borehole wall engaging member, means connecting said wall engaging member with said body for support thereby and for urging one surface of said wall engaging member against the borehole wall, a natural source of radioactivity embedded in said surface and providing radiation that is readily absorbed by materials in the vicinity of said source, whereby when said surface is against the wall of the borehole, said radiations will excite light in a highly localized area of the material comprising the borehole wall in the vicinity of said source, a window in said surface in the vicinity of said source and adapted to be transparent to said light, photoelectric means in said wall engaging member and disposed to receive the excited light through said window from said localized area on the borehole wall, and means for exhibiting a function of the response of said photoelectric means to said light as said body is moved through the borehole.

2. Apparatus as defined in claim 1 in which the radioactivity source is a beta ray emitter.

3. Apparatus as defined in claim 1 in which the window is disposed in proximity to said source so that the photoelectric means receives fluorescent light from the borehole wall.

4. Apparatus as defined in claim 1 in which the window is disposed in spaced apart relation to said source so that the photoelectric means receives phosphorescent light from the borehole wall.

5. Apparatus as defined in claim 1 together with means for causing said wall engaging member to penetrate any mud cake formed on the borehole wall to reach the underlying formation material.

References Cited in the file of this patent

UNITED STATES PATENTS

| | | |
|---|---|---|
| 2,133,776 | Bender | Oct. 18, 1938 |
| 2,241,154 | Neufeld | May 6, 1941 |
| 2,334,475 | Claudet | Nov. 16, 1943 |
| 2,351,028 | Fearon | June 13, 1944 |
| 2,469,461 | Russell | May 10, 1949 |

OTHER REFERENCES

Solid Fluorescent Materials, by R. P. Johnson from General Electric Co. Research Laboratory publication, June 1940, No. 1041, pages 146–147.